US008446859B2

(12) United States Patent
Kim et al.

(10) Patent No.: US 8,446,859 B2
(45) Date of Patent: May 21, 2013

(54) METHOD FOR CONTROLLING UPLINK LOAD IN CELL_FACH STATE

(75) Inventors: Sun Hee Kim, Anyang-Si (KR); Young Dae Lee, Anyang-Si (KR); Sung Duck Chun, Anyang-Si (KR); Sung Jun Park, Anyang-Si (KR); Seung June Yi, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 562 days.

(21) Appl. No.: 12/363,037

(22) Filed: Jan. 30, 2009

(65) Prior Publication Data

US 2009/0196230 A1    Aug. 6, 2009

Related U.S. Application Data

(60) Provisional application No. 61/025,311, filed on Feb. 1, 2008, provisional application No. 61/026,120, filed on Feb. 4, 2008, provisional application No. 61/039,095, filed on Mar. 24, 2008.

(30) Foreign Application Priority Data

Jan. 22, 2009    (KR) .................. 10-2009-0005441

(51) Int. Cl.
*H04W 4/00* (2009.01)
(52) U.S. Cl.
USPC ........... 370/328; 370/331; 370/335; 370/342; 455/450; 455/509
(58) Field of Classification Search .................. 370/455, 370/435, 436
See application file for complete search history.

(56) References Cited

U.S. PATENT DOCUMENTS

| 3,119,097 | A | 1/1964 | Tullos |
| 3,418,629 | A | 12/1968 | Chien |
| 3,439,279 | A | 4/1969 | Guanella |
| 6,028,854 | A | 2/2000 | Raith et al. |
| 7,218,619 | B2 * | 5/2007 | Koo et al. ............... 370/329 |

(Continued)

FOREIGN PATENT DOCUMENTS

| CN | 1645789 A | 7/2005 |
| CN | 1863407 A | 11/2006 |

(Continued)

OTHER PUBLICATIONS

Ericsson: "E-UTRAN Random Access procedure C-RNTI assignment and HARQ on message 4 with RACH model," 3GPP TSG-RAN WG2 #56bis, Draft; R2-070365, 3rd Generation Partnership Project (3GPP), Mobile Competence Centre; 650, Route Des Lucioles; F-06921 Sophia-Antipolis Cedex; France, vol. RAN WG2, No. Sorrento, Italy; 20070122, XP050133443 [retrieved on Jan. 22, 2007].

(Continued)

*Primary Examiner* — Ian N Moore
*Assistant Examiner* — Brian T Le
(74) *Attorney, Agent, or Firm* — Birch, Stewart, Kolasch & Birch, LLP

(57) ABSTRACT

A method for a user equipment (UE) to perform uplink re-access in a wireless communication system is provided. The method includes performing an uplink access procedure to establish a data transmission channel, checking whether or not the data transmission channel has been released, and delaying uplink re-access to the data transmission channel by a wait time when the data transmission channel has been released.

15 Claims, 16 Drawing Sheets

U.S. PATENT DOCUMENTS

| | | | |
|---|---|---|---|
| 7,801,081 B2* | 9/2010 | Choi et al. | 370/331 |
| 2003/0016698 A1 | 1/2003 | Chang et al. | |
| 2003/0210676 A1 | 11/2003 | Wu | |
| 2005/0105494 A1 | 5/2005 | Kim et al. | |
| 2005/0135318 A1 | 6/2005 | Walton et al. | |
| 2005/0141436 A1 | 6/2005 | Dick et al. | |
| 2005/0221838 A1 | 10/2005 | Cha et al. | |
| 2005/0287957 A1 | 12/2005 | Lee et al. | |
| 2006/0023629 A1 | 2/2006 | Kim et al. | |
| 2006/0146762 A1 | 7/2006 | Kuroda et al. | |
| 2006/0251105 A1 | 11/2006 | Kim et al. | |
| 2006/0281417 A1 | 12/2006 | Umesh et al. | |
| 2007/0049309 A1* | 3/2007 | Pan et al. | 455/509 |
| 2007/0115894 A1 | 5/2007 | Herrmann et al. | |
| 2007/0140178 A1 | 6/2007 | Jung et al. | |
| 2007/0189236 A1 | 8/2007 | Ranta-aho et al. | |
| 2007/0206531 A1 | 9/2007 | Pajukoski et al. | |
| 2007/0242764 A1 | 10/2007 | Anigstein et al. | |
| 2007/0248060 A1 | 10/2007 | Mooney et al. | |
| 2007/0253447 A1 | 11/2007 | Jiang | |
| 2007/0258402 A1 | 11/2007 | Nakamata et al. | |
| 2007/0288824 A1 | 12/2007 | Yeo et al. | |
| 2007/0291719 A1 | 12/2007 | Demirhan et al. | |
| 2008/0005638 A1 | 1/2008 | Kuo et al. | |
| 2008/0194674 A1 | 8/2008 | Grenard et al. | |
| 2009/0041240 A1 | 2/2009 | Parkvall et al. | |
| 2009/0103500 A1 | 4/2009 | Malkamaki et al. | |
| 2009/0149189 A1 | 6/2009 | Sammour et al. | |
| 2009/0168731 A1 | 7/2009 | Zhang et al. | |
| 2009/0191883 A1* | 7/2009 | Choi et al. | 455/450 |
| 2009/0245194 A1 | 10/2009 | Damnjanovic et al. | |
| 2009/0271679 A1 | 10/2009 | Harada et al. | |
| 2009/0287976 A1 | 11/2009 | Wang et al. | |
| 2010/0042886 A1 | 2/2010 | Kim et al. | |
| 2010/0067460 A1 | 3/2010 | Hu et al. | |
| 2010/0067468 A1 | 3/2010 | Ho et al. | |
| 2010/0081443 A1 | 4/2010 | Meyer et al. | |
| 2010/0165953 A1* | 7/2010 | Chen et al. | 370/335 |
| 2011/0182245 A1 | 7/2011 | Malkamaki et al. | |

FOREIGN PATENT DOCUMENTS

| | | |
|---|---|---|
| CN | 102067500 A | 5/2011 |
| CN | 102150389 A | 8/2011 |
| CN | 102160304 A | 8/2011 |
| CN | 102160320 A | 8/2011 |
| JP | 2006-87120 A | 3/2006 |
| JP | 2006-191312 A | 7/2006 |
| JP | 2007-531341 A | 11/2007 |
| JP | 2008-5492 A | 1/2008 |
| KP | 10-0389818 B1 | 12/2001 |
| KR | 10-2001-0110188 | 12/2001 |
| KR | 10-0487245 B1 | 6/2003 |
| KR | 10-2005-0120189 A | 12/2005 |
| KR | 10-0684319 B1 | 6/2006 |
| KR | 10-2006-0131808 A | 12/2006 |
| KR | 10-2007-0026156 A | 3/2007 |
| KR | 10-2007-0080544 A | 8/2007 |
| KR | 10-2007-0121505 A | 12/2007 |
| KR | 10-2008-0003682 A | 1/2008 |
| KR | 10-2008-0018105 A | 2/2008 |
| WF | WO 2007/052719 A1 | 5/2007 |
| WO | WO-2005/125226 A2 | 12/2005 |
| WO | WO 2006/104946 A1 | 10/2006 |
| WO | WO 2007/023364 A1 | 3/2007 |
| WO | WO-2007/091520 A1 | 8/2007 |
| WO | WO-2007/148706 A1 | 12/2007 |
| WO | WO-2009/020423 A1 | 2/2009 |
| WO | WO-2009/045011 A1 | 4/2009 |
| WO | WO-2009/057932 A2 | 5/2009 |

OTHER PUBLICATIONS

Ericsson: 3GPP TSG-RAN WG1 Meeting #52, Draft; R1-080898, 3rd Generation Partnership Project (3GPP), Mobile Competence Centre; 650, Route Des Lucioles; F-06921 Sophia-Antipolis Cedex; France, vol. RAN WG1, No. Sorrento, Italy; 20080215, XP050109373 [retrieved on Feb. 15, 2008], pp. 1-65.

LG Electronics Inc: "Allocation of a "short" CRNTI in msg2," 3GPP TSG-RAN WG2 #61, Draft; R2-081038 Short CRNTI, 3rd Generation Partnership Project (3GPP), Mobile Competence Centre; 650, Route Des Lucioles; F-06921 Sophia-Antipolis Cedes; France, vol. RAN WG2, No. Sorrento, Italy; 20080204, XP050138828 [retrieved on Feb. 4, 2008], pp. 1-2.

Nokia Siemens Networks et al: "Way Forward on Scrambling Sequence Initialisation," 3GPP TSG-RAN Working Group 1 #52, Draft; R1-081128, Scrambling, 3rd Generation Partnership Project (3GPP), Mobile Competence Centre; 650, Route Des Lucioles; F-06921 Sophia-Antipolis Cedex; France, vol. RAN WG1, No. Sorrento, Italy; 20080215, XP050109572 [retrieved on Feb. 15, 2008], 2 pages.

3GPP TSG-RAN WG2 62, Draft; R2-082508, "Scrambling of Message 3," Rd, 3rd Generation Partnership Project(3GPP), Mobile Competence Centre; 650, Route Des Lucioles; F-06921 Sophia-Antipolis Cedex; France, vol. RAN WG2, No. Kansas City, USA; 20080429, XP050140189 [retrieved on Apr. 29, 2008], pp. 1-3.

3GPP TSG-RAN WG2 #61 bis, LG Electronics Inc: "PDCP SN size for UL and DL", 3rd Generation Partnership Project, Mar. 25, 2008, R2-081586, pp. 1-3, XP050139318.

ETSI TS 125 322, "Universal Mobile Telecommunications System (UTMS); Radio Link Control (RLC) protocol specification (3GPP TS 25.322 version 7.3.0 Release 7)", V7.3.0, vol. 3-R2, Jun. 1, 2007, XP014040005.

Persson F., "Voice over IP Realized for the 3GPP Long Term Evolution", Vehicular Technology Conference, 2007, IEEE 66th, pp. 1436-1440.

"3GPP TS 36.300 V8.4.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 17, 2008, http://www.3gpp.org/ftp/Specs/2008-03/Re1-8/36_series/36300-840.zip.

"3GPP TS 36.321 V8.0.0, $3^{rd}$ Generation Partnership Project; Technical Specification Group Radio Access Network; Evolved Universal Terrestrial Radio Access (E-UTRA) Medium Access Control (MAC) protocol specification (Release 8)", pp. 1-23, Retrieved from the Internet: URL: http://www.quintillion.co.jp/#GPP/Specs/36321-800.pdf>, Dec. 1, 2007, XP-002521635.

LG Electronics Inc., "HARQ Feedback and Measurement Gap", 3GPP TSG-RAN WG2 #61bis, pp. 1-2, Shenzhen, China, Mar. 31-Apr. 4, 2008, R2-081602, XP050139330.

NTT DoCoMo, Inc., "UL HARQ handling when P-HICH collides with measurement gap", 3GPP TSG RAN WG2 #61bis, pp. 1-3, R2-081727, Shenzhen, China, Mar. 31-Apr. 4, 2008.

Nokia Corporation, Siemens Networks, "On Resource Release in Enhanced UL for CELL_FACH", 3GPP Draft, R2-080272, $3^{rd}$ Generation Partnership Centre, 650, Route Des Lucioles, F-06921 Sophia-Antipolis Cedex, France, No. Sevilla, Spain, 20080114, Jan. 7, 2008, XP050138135.

NEC, "Comparison of HS-based E-RACH Resource Assignment", 3GPP Draft, R2-080128, Comparision of HS -Based E-Rach Resource Assignment, $3^{rd}$ Generation Partnership Project (3GPP), Mobile Competence Centre, 650, Route Des Lucioles, F-06921 Sophia-Antipolis Cedex, France, No. Sevilla, Spain, 20080114, Jan. 9, 2008, XP050138011.

LG Electronics Inc., "Load Management of E-DCH Resource Release", 3GPP TSG-RAN WG2 #61bis, R2-081829, Mar. 31, 2008, pp. 1-4, XP002527402.

Ericsson, Back-off Operation for Enhanced Uplink in Cell_Fach, 3GPP Draft, R2-081502_EUL_BACK_OFF, $3^{rd}$ Generation Partnership Project (3GPP), Mobile Competence Centre, 650, Route Des Lucioles, F-06921 Sopha-Antipolis Cedex, France No. Shenzhen, China, 20080331, Mar. 25, 2008, XP050139243.

Ericsson, Samsung, "Control of Semi Persistent Scheduling," TSG-RAN WG2 Meeting #61, Tdoc R2-080765, Sorrento, Italy, Feb. 11-15, 2008, 2 pages.

Nokia Corporation, Nokia Siemens Networks, "Persistent Scheduling for DL," 3GPP TSG-RAN WG2 Meeting #60bis, R2-080018, R2-074680, Sevilla, Spain, Jan. 14-18, 2008, 5 pages.

Nokia et al., "Measurement Gaps way forward", 3GPP TSG-RAN WG2 Meeting #60, R2-075429, Nov. 5-9, 2007, 1 page provided.

Panasonic, "PDCCH/PHICH interaction—Detailed UE behaviour", 3GPP TSG RAN WG2#61, R2-080876, Feb. 11-15, 2008, 4 pages provided.

Panasonic, "UL HARQ behaviour with dynamic adaptive/non-adaptive operation", 3GPP TSG-RAN WG2 Meeting #60, R2-074854(R1-07xxxx), Nov. 5-9, 2007, 4 pages provided.

* cited by examiner

FIG. 12
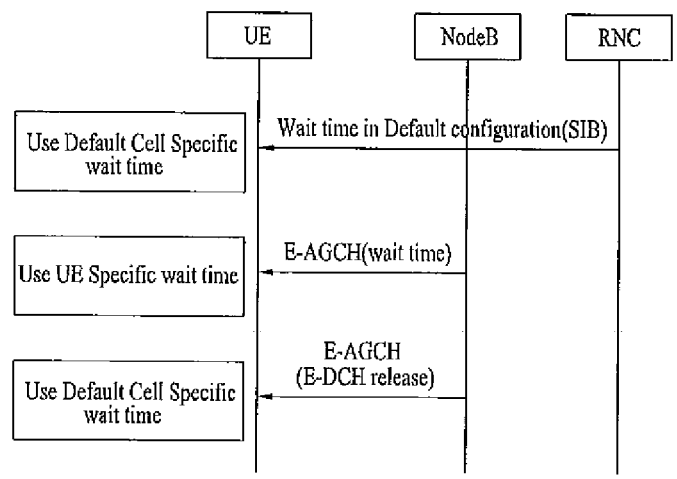
(a) Use Default Cell Specific wait time in case
no UE specific wait time is received.
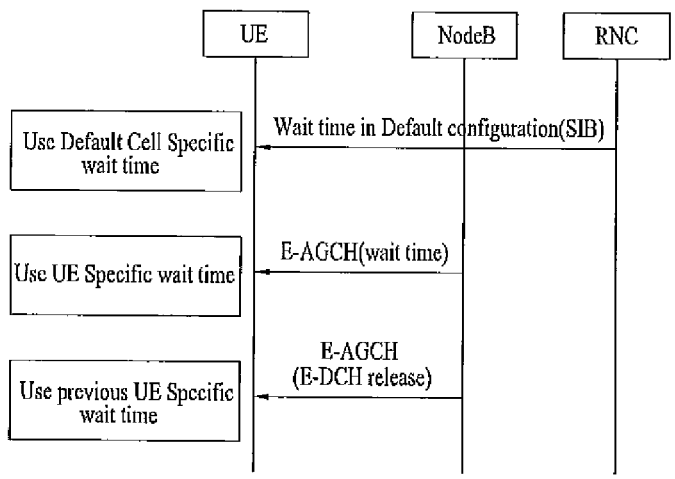
(b) Use previous UE Specific wait time in case
no UE specific wait time is received.

FIG. 13

| Previous Mapping of Absolute Grant Value | | Example of proposed Mapping of Absolute Grant Value | |
|---|---|---|---|
| Absolute Grant Value | Index | Absolute Grant Value | Index |
| $(168/15)^2 \times 6$ | 31 | 40ms | 31 |
| $(150/15)^2 \times 6$ | 30 | 20ms | 30 |
| $(168/15)^2 \times 4$ | 29 | 10ms | 29 |
| $(150/15)^2 \times 4$ | 28 | $(150/15)^2 \times 4$ | 28 |
| $(134/15)^2 \times 4$ | 27 | $(134/15)^2 \times 4$ | 27 |
| $(119/15)^2 \times 4$ | 26 | $(119/15)^2 \times 4$ | 26 |
| $(150/15)^2 \times 2$ | 25 | $(150/15)^2 \times 2$ | 25 |
| $(95/15)^2 \times 4$ | 24 | $(95/15)^2 \times 4$ | 24 |
| $(168/15)^2$ | 23 | $(168/15)^2$ | 23 |
| $(150/15)^2$ | 22 | $(150/15)^2$ | 22 |
| $(134/15)^2$ | 21 | $(134/15)^2$ | 21 |
| $(119/15)^2$ | 20 | $(119/15)^2$ | 20 |
| $(106/15)^2$ | 19 | $(106/15)^2$ | 19 |
| $(95/15)^2$ | 18 | $(95/15)^2$ | 18 |
| $(84/15)^2$ | 17 | $(84/15)^2$ | 17 |
| $(75/15)^2$ | 16 | $(75/15)^2$ | 16 |
| $(67/15)^2$ | 15 | $(67/15)^2$ | 15 |
| $(60/15)^2$ | 14 | $(60/15)^2$ | 14 |
| $(53/15)^2$ | 13 | $(53/15)^2$ | 13 |
| $(47/15)^2$ | 12 | $(47/15)^2$ | 12 |
| $(42/15)^2$ | 11 | $(42/15)^2$ | 11 |
| $(38/15)^2$ | 10 | $(38/15)^2$ | 10 |
| $(34/15)^2$ | 9 | $(34/15)^2$ | 9 |
| $(30/15)^2$ | 8 | $(30/15)^2$ | 8 |
| $(27/15)^2$ | 7 | $(27/15)^2$ | 7 |
| $(24/15)^2$ | 6 | $(24/15)^2$ | 6 |
| $(19/15)^2$ | 5 | $(19/15)^2$ | 5 |
| $(15/15)^2$ | 4 | $(15/15)^2$ | 4 |
| $(11/15)^2$ | 3 | $(11/15)^2$ | 3 |
| $(7/15)^2$ | 2 | $(7/15)^2$ | 2 |
| ZERO_GRANT* | 1 | ZERO_GRANT* | 1 |
| INACTIVE* | 0 | INACTIVE* | 0 |

FIG. 15

| Information Element/Group name | Need | Multi | Type and reference | Semantics description | Version |
|---|---|---|---|---|---|
|  |  |  |  |  |  |
| Common E-DCH system info | OP |  |  |  |  |
|  |  |  |  |  | REL-8 |

FIG. 16

| Information Element/Group name | Need | Multi | Type and reference | Semantics description | Version |
|---|---|---|---|---|---|
|  |  |  |  |  |  |
| AG to wait time mapping info | OP |  |  |  | REL-8 |
|  |  |  |  |  |  |

FIG. 17

| Information Element/Group name | Need | Multi | Type and reference | Semantics description | Version |
|---|---|---|---|---|---|
| Maximum E-DPDCH/DPCCH rate | MP |  |  | Defalt value is 31 | REL-8 |
| AG-to-wait time mapping |  |  | 1 to <31 - Maximum E-DPDCH/DPCCH rate> |  |  |
| >wait time | MP |  | Integer(1..50) | Time in 10ms. | REL-8 |

FIG. 18
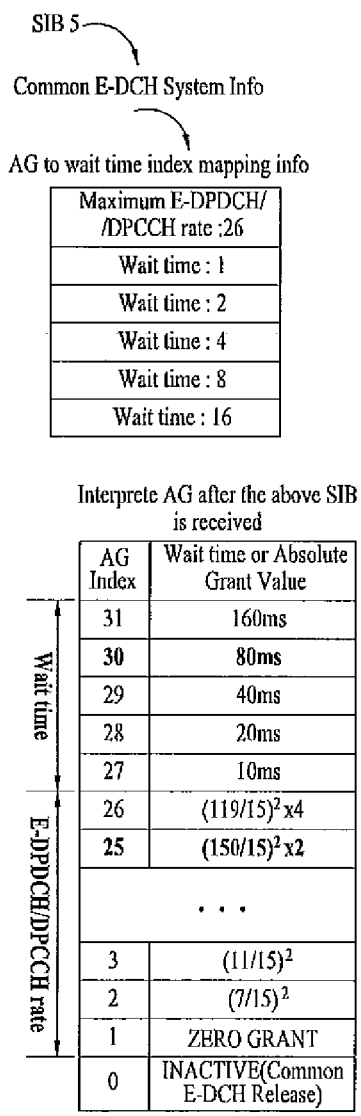
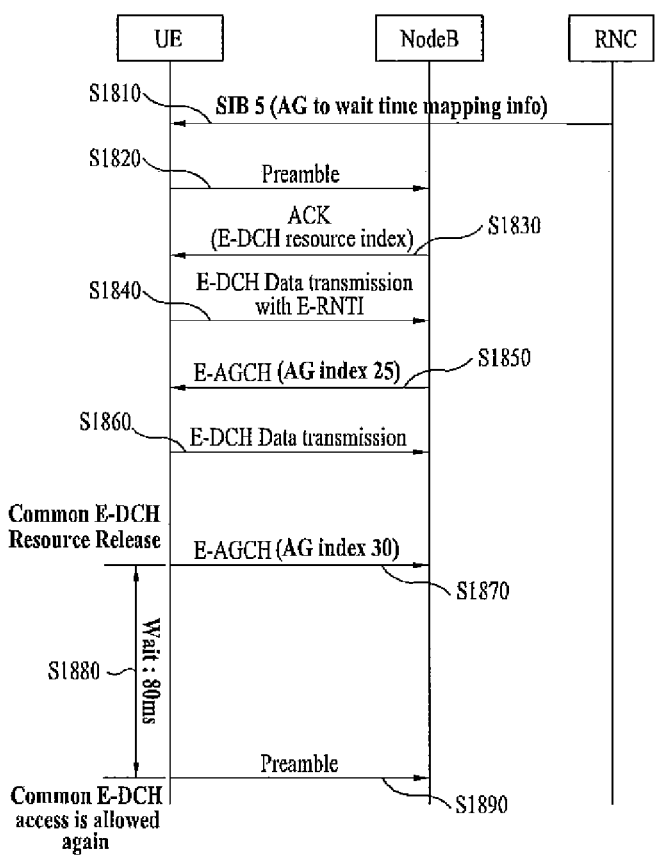

METHOD FOR CONTROLLING UPLINK LOAD IN CELL_ FACH STATE

This application claims the benefit of the U.S. Provisional Application Nos. 61/025,311, filed on Feb. 1, 2008; 61/026,120 filed on Feb. 4, 2008 and 61/039,095 filed on Mar. 24, 2008, which are hereby incorporated by reference as if fully set forth herein.

This application claims the benefit of the Korean Patent Application No. 10-2009-0005441, filed on Jan. 22, 2009, which is hereby incorporated by reference as if fully set forth herein.

BACKGROUND OF THE INVENTION

1. Field of the Invention

The present invention relates to a wireless communication system, and more particularly, to a method for controlling cell load in a wireless communication system.

2. Discussion of the Related Art

Generally, WCDMA (wideband code division multiple access) based 3GPP (3rd generation partnership project) wireless communication systems are ongoing to be widely spread over the world. WCDMA system has started from Release 99 (R99) and had introduced HSPDA (high speed downlink packet access) and HSUPA (high speed uplink packet access) as wireless access technologies having high competitiveness in mid-term future. The WCDMA system also introduces E-UMTS as a wireless access technology having high competitiveness in long-term future. The E-IMTS is the system that has evolved from WCDMA UMTS and its standardization is ongoing by 3GPP. Moreover, the E-UMTS is called LTE (long term evolution) system. For the details of technical specifications of UMTS and E-UMTS, it is able to refer to Release 7 and Release 8 of '$3^{rd}$ Generation Partnership Project Technical Specification Group Radio Access Network', respectively.

FIG. 1 is a diagram of a network structure of UMTS (universal mobile telecommunications system).

Referring to FIG. 1, a UMTS includes a user equipment (hereinafter abbreviated UE), a UMTS radio access network (hereinafter abbreviated UTRAN) and a core network (hereinafter abbreviated CN). The UTRAN includes at least one or more radio network subsystems (RNS). Each of the radio network subsystems (RNS) includes a single radio network controller (hereinafter abbreviated RNC) and at least one base station (Node B). The RNC manages the at least one base station. And, at least one or more cells exist in one base station.

FIG. 2 is a diagram of a radio protocol used for UMTS.

Referring to FIG. 2, radio protocol layers exist as a pair in a user equipment and a UTRAN and are responsible for data transfer in a radio interface. All protocols are inserted in one UE, whereas protocols can be distributed per network element in UTRAN. Comparing to the generally-known OSI (open systems interconnection) reference model, a physical layer (PHY) corresponds to a first layer (L1). MAC (medium access control), RLC (radio link control), PDCP (packet data convergence protocol) and BMC (broadcast/multicast control) layers correspond to a second layer (L2), respectively. And, RRC (radio resource control) layer corresponds to a third layer (L3). Information exchange between protocol layers is performed via a virtual access point called a service access point (hereinafter abbreviated SAP).

The PHY layer plays a role in transferring data in a radio interface using various radio transmission technologies. The PHY layer is responsible for a reliable data transfer in a radio interface. Data multiplexing, channel coding, spreading, modulation and the like are applied to the PHY layer for the data transfer. The PHY layer is connected to the MAC layer, which is an upper layer, via a transport channel. The transport channel can be classified into a dedicated transport channel or a common transport channel according to a presence or non-presence of channel sharing.

The MAC layer plays a role in mapping various logical channels to various transport channels. And, the MAC layer also plays a role as logical channel multiplexing for mapping several logical channels to one transport channel. The MAC layer is connected to an upper layer (RLC layer) via a logical channel. The logical channel can be classified into a control channel for carrying information of a control plane or a traffic channel for carrying information of a user plane according to a type of transmitted information.

The MAC layer can be divided into a MAC-b sublayer, a MAC-d sublayer, a MAC-c/sh sublayer, a MAC-hs/ehs sublayer and a MAC-e/es or a MAC-/i/is sublayer. First of all, the MAC-b sublayer is responsible for management of BCH (broadcast channel) that is a transport channel responsible for broadcasting of system information. The MAC-c/sh sublayer manages such a common transport channel shared with other user equipments as a FACH (forward access channel) and a DSCH (downlink shared channel). The MAC-d sublayer is responsible for management of a DCH (dedicated channel) that is a dedicated transport channel for a specific user equipment. To support high speed downlnk data transfer, the MAC-hs/ehs sublayer manages a HS-DSCH (high speed downlink shared channel) that is a transport channel for high speed downlink data transfer. And, the MAC-e/es or MAC-/i/is sublayer manages a E-DCH (enhanced dedicated channel) that is a transport channel for high speed uplink data transfer.

The RLC layer is responsible for QoS guarantee of a radio bearer (hereinafter abbreviated RB) and corresponding data transfer. The RLC layer comprises one or two independent RLC entities for each RB to guarantee unique QoS of the corresponding RB. The RLC layer provides three kinds of RLC modes, which include transparent mode (TM), unacknowledged mode (UM) and acknowledged mode (AM), to support various QoS. Besides, the RLC layer plays a role in adjusting a data size to enable a lower layer to fit for a transfer data in a radio interface. For this, the RLC layer performs functions of segmentation and/or concatenation on data received from an upper layer.

The PDCP layer is located above the RLC layer. The PDCP layer enables data, which is carried on such an IP packet as IPv4 and IPv6, to be efficiently transferred in a radio interface having a relatively narrow bandwidth. For this, the PDCP layer performs a header compression function. In this case, the header compression function enables a header part of data to carry essential information only, thereby increasing transfer efficiency in a radio interface. As the header compression is a basic function of the PDCP layer, the PDCP layer mainly exists in a packet switched (PS) domain. In order to provide a header compression function effective for a PS service, one PDCP entity exists per RB. On the contrary, in case that the PDCP layer exists in CS domain, the header compression function is not provided.

The BMC layer exists above the RLC layer. The BMC layer performs a function of scheduling a cell broadcast message and a function of broadcasting a cell broadcast message to user equipments existing in a specific cell.

The RRC layer is located at a bottom of the third layer and is defined in a control plane only. In association with configuration, reconfiguration and release of radio bearers (RBs), the RRC layer controls parameters of the first and second layers.

And, the RRC layer controls logical channels, transport channels and physical channels. In this case, the RB means a logical path provided for data transfer between a user equipment and a UTRAN by the first and second layers of the radio protocol. Generally, the RB configuration means a process for specifying a radio protocol layer and channel characteristics required for providing a specific service and a process for setting detailed parameters and operating methods.

In a WCDMA system, an R99 UE, which is in a CELL_DCH state, transmits a large amount of data using a DCH and a Release 6 UE transmits a large amount of data using an E-DCH/HS-DSCH. The R99 UE transmits data using an RACH in an IDLE state or a CELL_FACH state. The CELL_FACH state is a state in which a dedicated physical channel has not been allocated to the UE and the UE uses a common transmission channel although an RRC connection has been established. However, in the CELL_FACH state, the UE can transmit data using a dedicated logical channel. The CELL_FACH state is generally used when the amount of traffic exchanged between the UE and the UTRAN is small. The UE receives data while monitoring an FACH and uses an RACH when transmitting data in uplink. When the UE is in the CELL_FACH state, the UE can receive a BCH in order to obtain system information. Since the UE which is in the CELL_FACH state uses a common transmission channel, RNTI information for UE identification may be included in a MAC header. Since data transmission is possible through the RACH although no RRC connection has been established, the RACH has a small signaling delay time, compared to the E-DCH. For HTTP transmission or keep alive message transmission, a common E-DCH, which achieves the advantages of both the RACH and the E-DCH such as rapid signaling and large data transmission capacity, is being discussed in an "Enhanced Uplink for CELL_FACH state for FDD" Work Item (WI).

FIG. 3 illustrates dedicated E-DCH transmission, legacy RACH transmission, and common E-DCH transmission. In FIG. 3, the horizontal axis represents time and the vertical axis represents power level.

First, a method for performing dedicated E-DCH transmission is described. The network knows E-RNTIs which are identities of UEs. The network can allocate wireless resources to each UE on a Transmission Time Interval (TTI) basis through an Enhanced Absolute Grant Channel (E-AGCH) according to wireless environments that change dynamically and rapidly. Accordingly, the UE can transmit data only when the network allocates resources to the UE every TTI. The E-AGCH is a common channel that is received by all UEs in the cell. Since a number of UEs in the cell receive the same E-AGCH, a Cyclic Redundancy Check (CRC) generated using an E-RNTI of a specific UE is used to allocate resources to the specific UE. Accordingly, CRC checking will be successful for each UE to which resources have been allocated and CRC checking will be unsuccessful for each UE to which resources have not been allocated. The E-AGCH message has a 5-bit Absolute Grant (AG) value and a 1-bit AG scope. The AG value indicates maximum E-DCH traffic, which can be used in the next TTI, using an E-DPDCH/DPCCH rate (see "Previous Mapping of Absolute Grant Value" in FIG. 13). The UE determines a serving grant and whether or not an HARQ is active using an E-AGCH. Thereafter, the UE determines the maximum number of bits for transmission from the serving grant using a serving grant update function and an Enhanced Transport Format Combination (E-TFC) selection function. Accordingly, the amount of data that can be transmitted through an E-DCH can be changed every TTI according to the maximum amount of E-DPDCH/DPCCH resources allocated by the network.

The following is a description of a legacy random access procedure (RACH). The RACH is used to transmit short-length data in uplink. Some RRC messages such as an RRC connection request message, a cell update message, and a URA update message are also transmitted through the RACH. Logical channels such as a Common Control Channel (CCCH), a Dedicated Control Channel (DCCH), or a Dedicated Traffic Channel (DTCH) can be mapped to a transmission channel (RACH) The transmission channel (RACH) can be mapped to a physical channel (e.g., a Physical Random Access Channel (PRACH)). When a UE Medium Access Control (MAC) layer instructs a UE physical layer to transmit a PRACH, the UE physical layer first selects an access slot and a signature and transmits a PRACH preamble in uplink. The preamble is transmitted during an access slot duration that is 1.33 ms long and a signature selected from among 16 signatures is transmitted during a predetermined initial period of the access slot. When the UE transmits a preamble, the Node B transmits a response signal through a downlink physical channel, i.e., an Acquisition Indicator Channel (AICH). The AICH transmitted as a response to the preamble carries the signature selected by the preamble during the first predetermined period of the access slot through which the preamble has been transmitted. The Node B transmits an acknowledgement (ACK) or a negative acknowledgement (NACK) through the signature transmitted through the AICH.

The following is a description of the method for transmitting a common E-DCH. The common E-DCH is being discussed as a WI but not all procedures thereof have been discussed. A common E-DCH that has been approved is described below. The common E-DCH transmission method is a combination of the dedicated E-DCH transmission method with the legacy RACH. A channel allocation request for data transmission is issued using the RACH preamble, i.e. L1 PRACH transmission, and data transmission is performed using the E-DCH. Since the channel that a UE which is in a CELL_FACH uses for uplink access is limited to the RACH, the UE requests an E-DCH using a random access procedure when there is a need to transmit a large amount of uplink data. Specifically, configuration information for the common E-DCH is transmitted to all UEs in the cell through a common E-DCH system Information Element (IE) of SIB 5 and SIB 5*bis* that the Node B broadcasts to the cell. The UE transmits a preamble for access to the common E-DCH channel in uplink and the Node B transmits an ACK or NACK to the UE through an AICH. When a common E-DCH has been allocated, the Node B transmits an AG value through an E-AGCH to allocate wireless resources to each UE. The UE monitors the E-AGCH until the common E-DCH is released. The Node B sets the AG value to "INACTIVE" to release the common E-DCH.

FIG. 4 is a flow chart illustrating an RACH transmission control procedure.

As shown in FIG. 4, a UE receives an RACH parameter from an RRC (S402). Thereafter, when data to be transmitted is present, the UE selects an Access Service Class (ASC) (S404 and S406) and attempts an L1 PRACH transmission procedure using a probability value obtained from the selected ASC (S408). When the UE performs L1 PRACH transmission, the UE attempts preamble ramping. That is, when preamble transmission has failed, the UE increases preamble transmission power by a ramping step when performing preamble retransmission. Thereafter, the UE monitors the AICH in order to check whether or not preamble transmission is successful (S410). When an ACK has been received, the UE assumes that L1 PRACH transmission is successful and transmits data in the next TTI. When no response (i.e., ACK) has been received, the UE reattempts the L1 PRACH transmission procedure after waiting 10 ms. On the other hand, when a NACK has been received, the UE reattempts the L1 PRACH transmission procedure after waiting a back-off time. The back-off time is broadcast to all UEs in the cell using an SIB. That is, the back-off time is a cell-specific parameter and is commonly applied to all UEs in the cell that attempt random access.

The following is a description of setup of a radio bearer according to QoS. QoS stands for "Quality of Service", which an end user experiences when receiving a specific service. Typical factors that affect QoS include delay, error ratio, and bit rate. Specifically, examples of the delay include delay for channel allocation and delay for establishment of a connection when a number of users are present. When providing a service to an end user, first, the UMTS determines appropriate QoS according to the type of the service. Here, the appropriate QoS is the minimum QoS with which the end user can receive the service without difficulty. By setting the appropriate QoS to the minimum QoS, the UMTS can provide the service to a number of users. That is, if the UMTS provides a service with high QoS only to a specific user although wireless resources are limited, a large amount of wireless resources is allocated to the specific user, and therefore the total number of users to which the UMTS can provide services is reduced from the cell viewpoint.

For example, let us assume that a Serving GPRS Support Node (SGSN) has received a request for a Voice over Internet Protocol (VoIP) service from a UE. In this case, the SGSN determines QoS suitable for providing a VoIP service taking into consideration resources, priority, and capabilities of the UE. Thereafter, the SGSN notifies a Radio Network Controller (RNC) of the determined QoS-Uu. The RNC sets up RBs suitable for the respective QoSs of all UEs based on the QoS-Uu. Since a number of UEs requesting different QoSs are present in the cell, the network should perform load control and congestion control so as to satisfy all QoSs.

In the recent UMTS release 8, use of a common E-DCH is being discussed in an "Enhanced uplink for CELL_FACH state in FDD" Work Item (WI) in order to transmit services such as VoIP and HTTP as efficiently as possible. If random access is successful after a preamble is transmitted, then the legacy RACH transmits a message during only one TTI. However, if access is successful after a preamble is transmitted, then the E-DCH transmits data during a number of TTIs until the common E-DCH is released. For the network, it is necessary to perform load control of the common E-DCH since the common E-DCH transmits a large amount of data, unlike the legacy RACH. Particularly, there is a need to control uplink access load when a UE attempts to re-access a common E-DCH that has been released.

SUMMARY OF THE INVENTION

Accordingly, the present invention is directed to a method for controlling cell load in a wireless communication system that substantially obviates one or more problems due to limitations and disadvantages of the related art.

An object of the present invention is to provide a method for controlling uplink access load in a wireless communication system.

Another object of the present invention is to provide a method for controlling uplink access load in a CELL_FACH state.

Another object of the present invention is to provide a method for controlling uplink access load of each UE in a CELL_FACH state.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for a user equipment (UE) to perform uplink re-access in a wireless communication system includes performing an uplink access procedure to establish a data transmission channel, checking whether or not the data transmission channel has been released, and delaying uplink re-access to the data transmission channel by a wait time when the data transmission channel has been released. Whether or not the wait time has elapsed can be determined using a timer.

The UE may be in a CELL_Forward Access CHannel (CELL_FACH) state. The data transmission channel is preferably a dedicated channel and, more preferably, a common E-DCH.

The uplink access procedure may include a random access procedure. The method may further include transmitting a random access preamble for uplink re-access to the data transmission channel in uplink after the wait time elapses.

The method may further include monitoring a separate channel in order to receive information associated with release of the data transmission channel. The separate channel may be an E-AGCH.

The information associated with the wait time may be received using at least one of a Radio Resource Control (RRC) message, a High Speed-Downlink Shared CHannel (HS-DSCH), and an E-AGCH.

The wait time may be indicated by a specific AG value transmitted through an E-AGCH, and the method may further include transmitting mapping information representing a relation between the wait time and the specific AG value. The specific AG value may additionally indicate information associated with release of the data transmission channel. The mapping information may be received through system information or an RRC message.

The wait time may be UE-specific or cell-specific.

In another aspect of the present invention, a method for controlling uplink re-access in a wireless communication system includes establishing a data transmission channel for a user equipment (UE) according to an uplink access procedure, transmitting, to the UE, information associated with a wait time for delaying uplink re-access of the UE to the data transmission channel when the data transmission channel has been released, and releasing the data transmission channel.

The embodiments of the present invention have the following advantages.

First, it is possible to control uplink access load in a wireless communication system.

Second, it is possible to control uplink access load in a CELL_FACH state.

Third, it is possible to control uplink access load of each UE in a CELL_FACH state.

Advantages of the present invention are not limited to those described above and other advantages will be clearly understood by those skilled in the art from the following description.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments) of the invention and together with the description serve to explain the principle of the invention. In the drawings:

FIG. 12 illustrates an example operation of a UE when no wait time has been received;

FIG. 13 illustrates an example wherein Absolute Grant (AG) value mapping is changed according to an embodiment of the present invention;

FIGS. 15 to 17 illustrate an example wherein changed AG value mapping is incorporated into a System Information Block (SIB) according to an embodiment of the present invention; and FIG. 18 illustrates an example wherein a changed SIB and changed AG value mapping are applied to perform communication according to an embodiment of the present invention.

DETAILED DESCRIPTION OF THE INVENTION

The above and other configurations, operations, and features of the present invention will be easily understood from the embodiments of the invention described below with reference to the accompanying drawings. The embodiments described below are examples wherein technical features of the invention are applied to an Evolved Universal Mobile Telecommunications System (E-UMTS).

Figure 5:
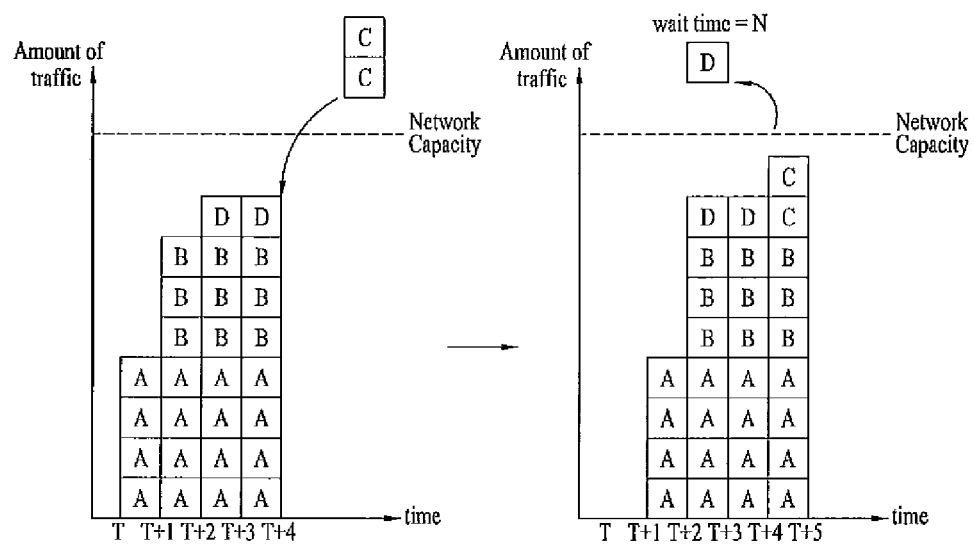
FIG. 5 illustrates an example scenario wherein load control is performed when a number of UEs are present in a cell according to an embodiment of the present invention.

FIG. 5 illustrates an example scenario wherein load control is performed when a number of UEs are present in a cell according to an embodiment of the present invention.

As shown in FIG. 5, four types of UEs (UEs A-D) are present in a cell. Here, let us assume that the UEs A to D are in a CELL_FACH state. The UE A has highest priority and the UE D has lowest priority. Since the total capacity of the network is limited, the network will allocate resources to each UE according to requests made by the UE within the total network capacity. The network resource allocation will also vary according to the QoS of the UE.

As shown in the left side of FIG. 5, the UE A, the UE B, and the UE D, which are in a CELL_FACH state, request allocation of common E-DCH wireless resources at times T, T+1, and T+2, respectively. Since the amount of common E-DCH wireless resources requested by the UE A, UE B, and UE D is within the total network capacity, the network allocates common E-DCH wireless resources to the UE A, UE B, and UE D. Thereafter, at time T+4, the UE C requests that the network allocate common E-DCH wireless resources.

As shown at the right side of FIG. 5, if the Node B allocates the same amount of common E-DCH wireless resources as requested by the UE C to the UE C, the total amount of common E-DCH wireless resources to be allocated will exceed the total network capacity. Accordingly, the Node B determines a UE, the resource allocation of which is to be released, among the UEs including the UE C according to the priority of the UE. If the UEs are not given priority levels, the Node B may randomly determine the UE, the resource allocation of which is to be released. The Node B releases resource allocation of the UE D with the lowest priority and newly allocates a common E-DCH to the UE C. Since the total amount of common E-DCH resources allocated to the Node B is limited, the UE DD is forcibly released from the common E-DCH by the Node B even though the UE D has data to be transmitted. In this case, the UE D will attempt to make a re-access request since the UE D has data to be transmitted. However, since there are no available communication resources, the re-access request of the UE D may repeatedly fail, causing uplink access load. Accordingly, it is possible to prevent congestion by restricting re-access of a UE, which has been released from the common E-DCH by the Node B, to the common E-DCH for a predetermined time. In the example of FIG. 5, the UE D is prohibited from re-access to the common E-DCH during a wait time N.

Figure 6:
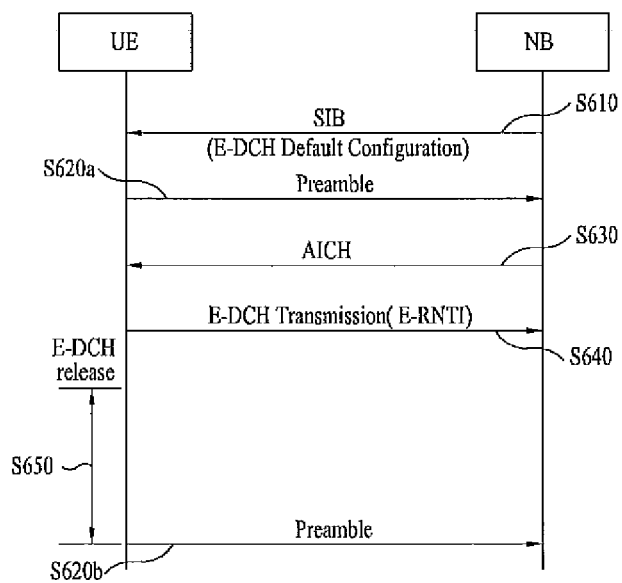
FIG. 6 illustrates an example procedure of the scenario illustrated in FIG. 5.

FIG. 6 illustrates an example procedure of the scenario illustrated in FIG. 5.

As shown in FIG. 6, a UE receives common E-DCH default configuration information through system information (S610). If the UE has data to be transmitted in uplink, the UE transmits a preamble in uplink to attempt access to a common E-DCH (S620a). A Node B transmits a response to the preamble to the UE through an AICH (S630). When the response is an ACK, the UE transmits data through the common E-DCH (S640). The Node B releases the common E-DCH for some reason while receiving data from the UE. In this case, the UE desires to re-access the common E-DCH since it still has data to be transmitted. However, the UE waits, without immediately attempting re-access to the common E-DCH, until a predetermined time elapses after the common E-DCH is released (S650). When the predetermined time has elapsed, the UE transmits a preamble in uplink to re-access the common E-DCH (S620a).

Figure 7:
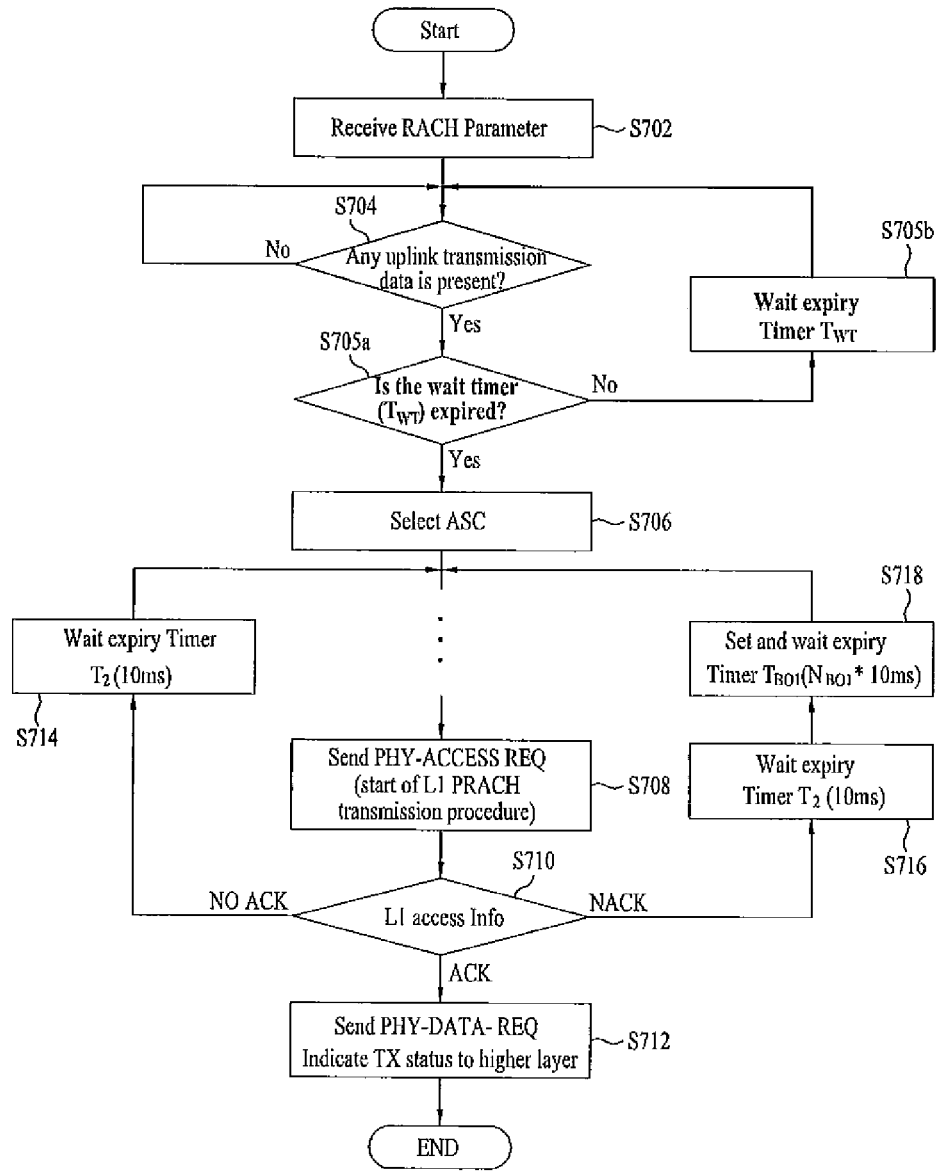
FIG. 7 is a flow chart illustrating an example procedure of the scenario illustrated in FIG. 5.

FIG. 7 is a flow chart illustrating an example procedure of the scenario illustrated in FIG. 5.

Figure 1:
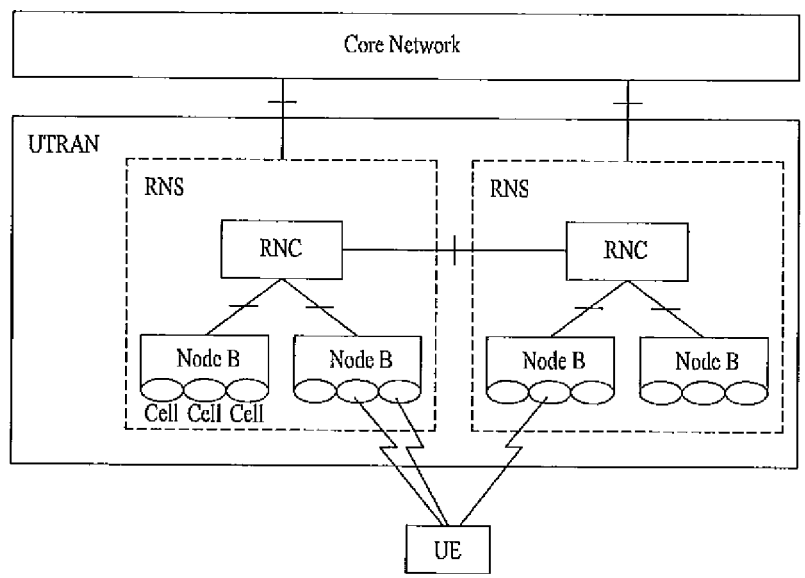
FIG. 1 illustrates a UMTS network structure.
Figure 2:
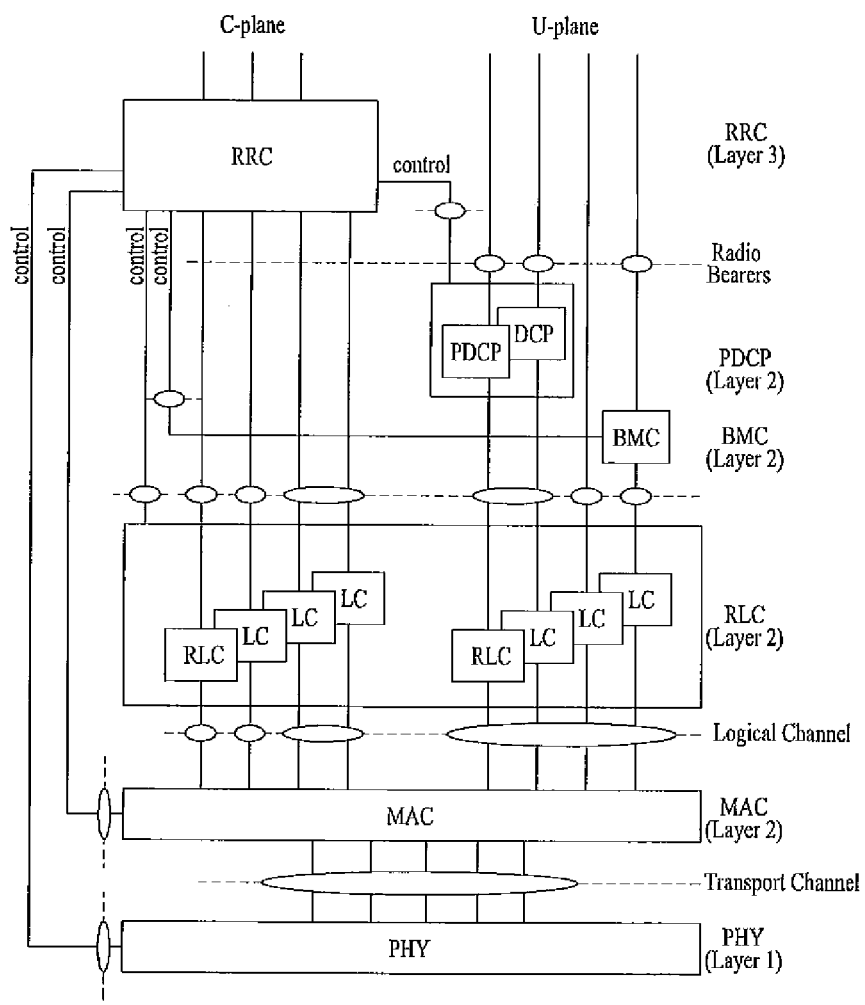
FIG. 2 illustrates a radio protocol structure used for the UMTS.
Figure 3:
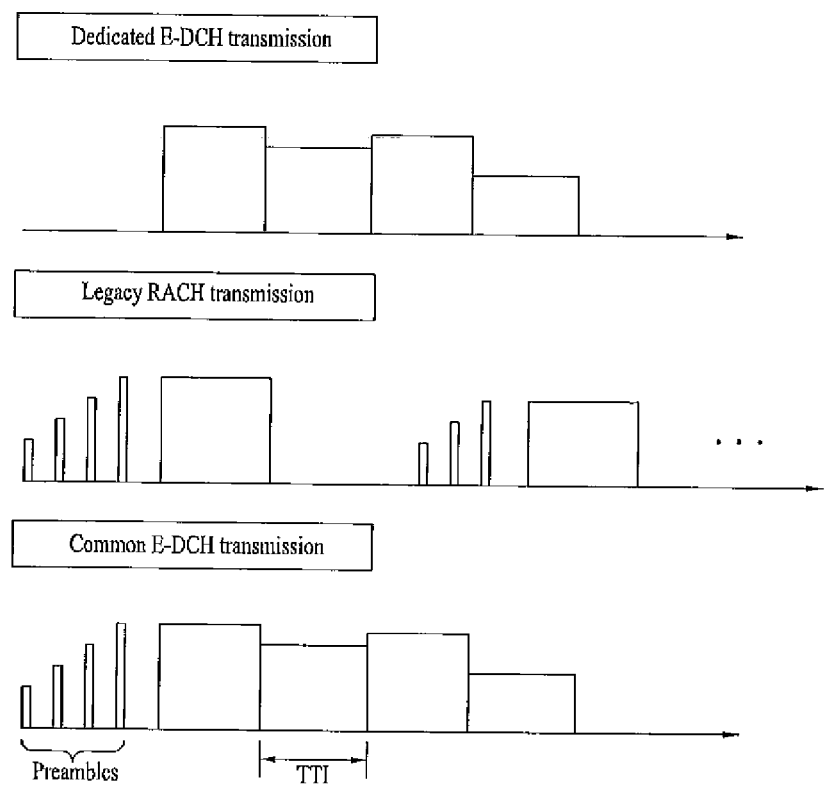
FIG. 3 illustrates dedicated E-DCH transmission, legacy RACH transmission, and common E-DCH transmission.
Figure 4:
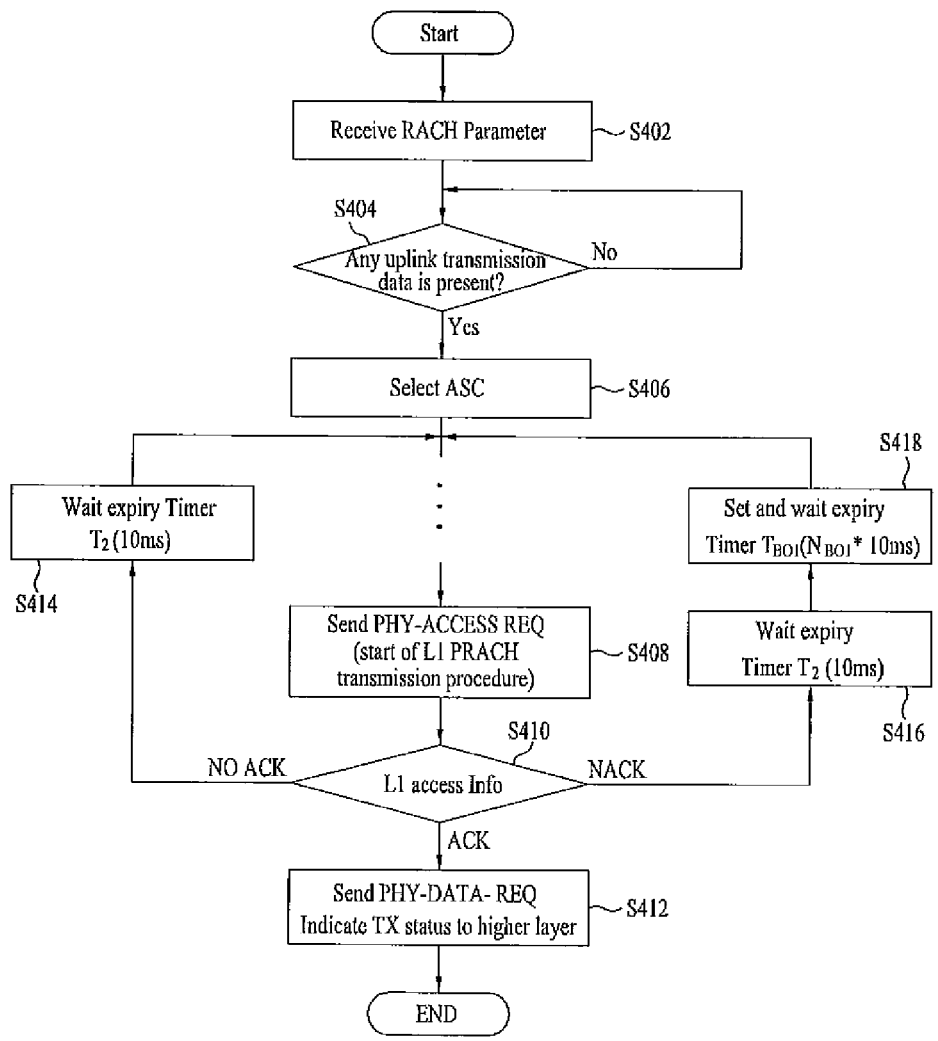
FIG. 4 is a flow chart illustrating an RACH transmission control procedure.

As shown in FIG. 7, the basic procedure of FIG. 7 is the same as described above with reference to FIG. 4 and steps S702 to S718 correspond to steps S402 to S418 of FIG. 4. Thus, refer to the description of FIG. 4 for details of those steps. The difference from FIG. 4 is that steps S705a and S705b are added. Specifically, if the UE has data to be transmitted in uplink, the UE checks whether or not a wait timer $T_{WT}$ has expired before transmitting a preamble (S705a). When the wait timer has expired, the UE performs the same operations as in the RACH transmission procedure after selecting an ASC (S706-S718). However, when the wait timer has not expired, the UE waits until the wait timer expires (S705b). After the wait timer expires, the UE performs the same operations as in the RACH transmission procedure after selecting an ASC (S706-S718).

A method for notifying a UE of a wait time and how the UE operates in this method according to an embodiment of the present invention will now be described with reference to FIGS. 8 to 11.

Figure 8:
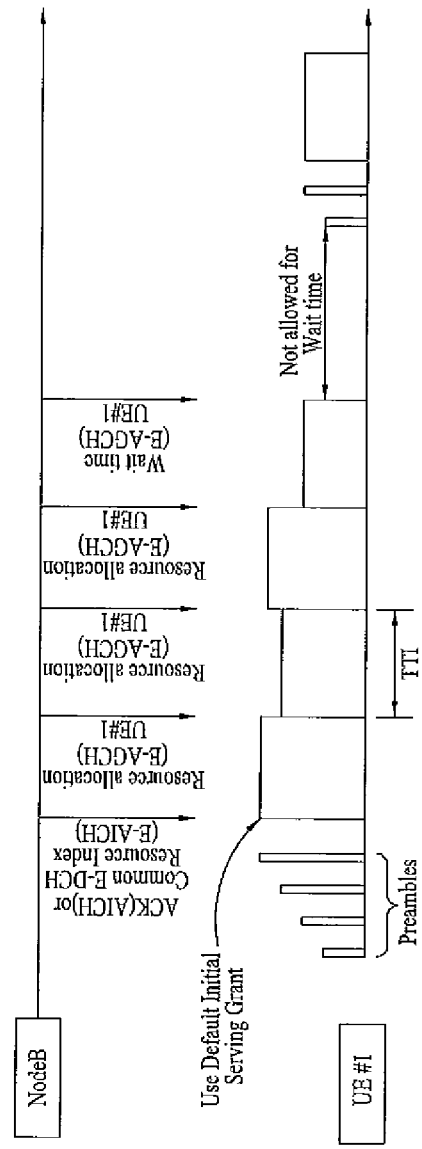
FIGS. 8 to 10 illustrate a method for notifying a UE of a wait time and how the UE operates in this method according to an embodiment of the present invention.

FIG. 8 illustrates an example wherein a Node B transmits a wait time to each UE through an E-AGCH which is a dedicated control channel. As shown in FIG. 8, a UE transmits a preamble to attempt access to a common E-DCH. When the access is successful, the UE transmits data to a Node B through the common E-DCH. The UE determines the power level and amount of data for initial transmission using a default initial serving grant of which the Node B has notified UEs in the cell. The Node B performs allocation of resources of the common E-DCH to the UE by notifying the UE of the maximum level of power, which can be used in the next TTI, through a dedicated control channel, an E-AGCH. The UE determines the power level and amount of data for transmission in the next TTI using the maximum power level. When the Node B desires to release the common E-DCH, the Node B notifies the UE of a wait time through an E-AGCH. Upon receiving the wait time, the UE releases the common E-DCH. Thereafter, when the common E-DCH has been released, the UE does not attempt re-access to the common E-DCH until a predetermined time elapses even though the UE still has data to be transmitted. The method for notifying the UE of the wait time through the E-AGCH will be described later in more detail with reference to FIGS. 13 to 18.

Figure 9:
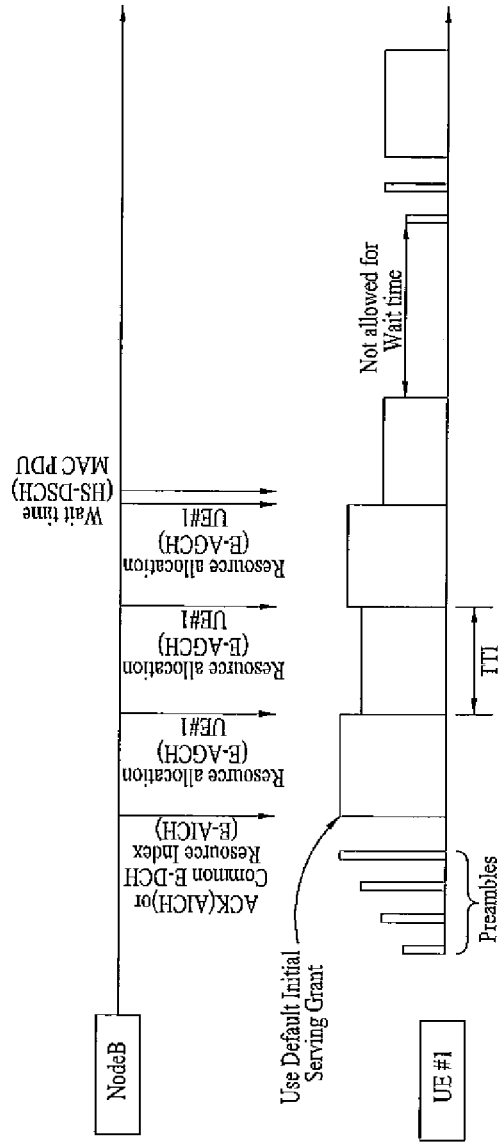

FIG. 9 illustrates an example wherein a Node B transmits a wait time to each UE through an HS-DSCH. The example of FIG. 9 is identical to that of FIG. 8, except that the Node B transmits the wait time through an HS-DSCH, which is a downlink common data transmission channel. In this case, the UE should monitor both the E-AGCH and the HS-DSCH every TTI. Accordingly, the UE should have both an H-RNTI and an E-RNTI. The wait time may be included in a MAC Protocol Data Unit (PDU) received through the HS-DSCH. Accordingly, it may be more efficient to use the E-AGCH rather than the HS-DSCH. Although use of the HS-DSCH is illustrated in the example of FIG. 9, the above method can be applied in a similar manner to a downlink common data transmission channel other than the HS-DSCH.

Figure 10:
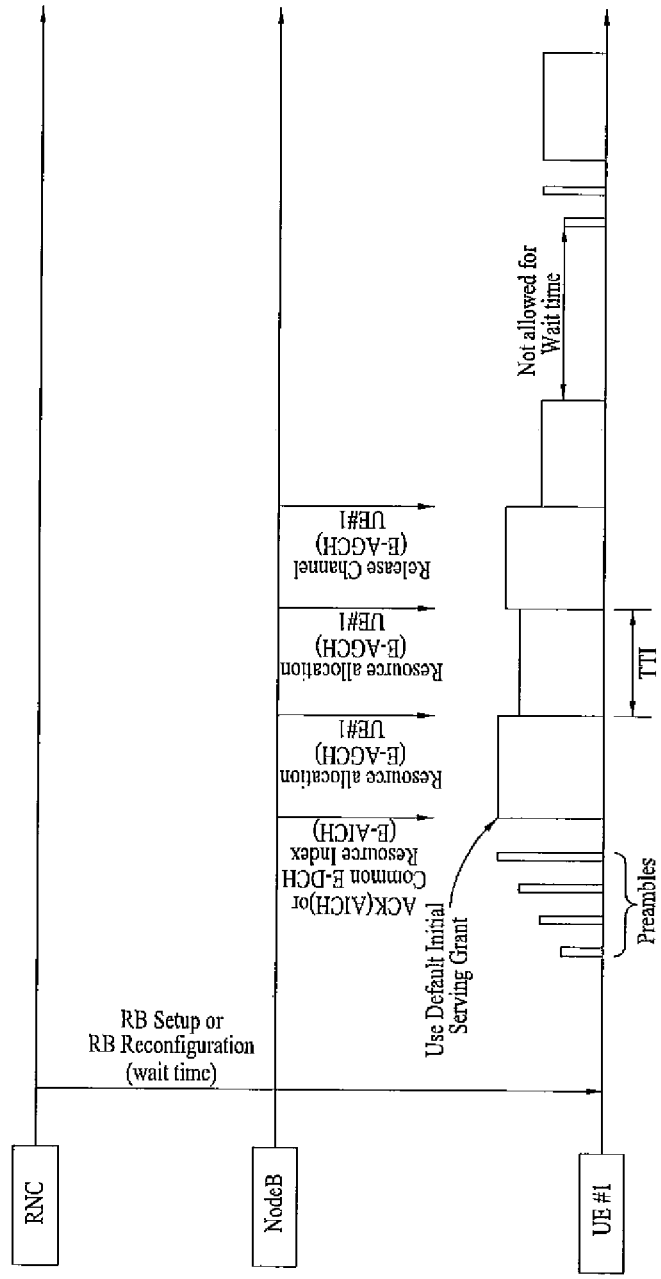

FIG. 10 illustrates an example wherein an RNC transmits a wait time to each UE. The RNC can notify the UE of the wait time through an RB setup message, an RB reconfiguration message, or the like. The RNC can transmit a different wait time to each UE using an RB setup message, an RB reconfiguration message, or the like. The Node B can release the common E-DCH by signaling "INACTIVE" through an E-AGCH. Each time the common E-DCH is released, each UE uses a wait time received through an RB setup message, an RB reconfiguration message, or the like. Thereafter, when the UE has received a new wait time through an RB reconfiguration message, the UE can update a wait time stored therein with the new wait time.

Figure 11:
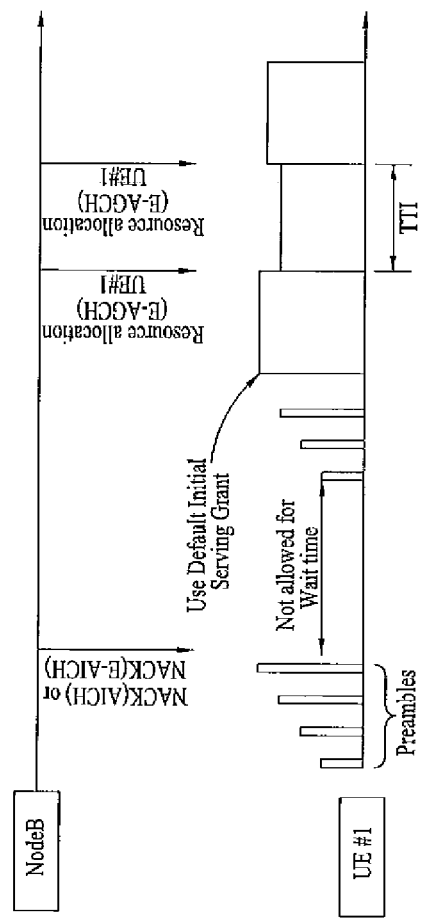
FIG. 11 illustrates an example wherein a UE uses a wait time upon receiving a NACK through an AICH or an E-AICH according to an embodiment of the present invention.

FIG. 11 illustrates how a UE operates upon receiving a NACK through an AICH or an E-AICH.

As shown in FIG. 11, if the UE receives a NACK through an E-AICH after performing preamble ramping, the Node B cannot determine which UE has performed preamble ramping and thus cannot notify each UE of a corresponding wait time. In this case, the UE cannot use a UE-specific wait time that has been previously received. If no UE-specific wait time has been previously received, the UE can use a back-off value of PRACH system information which is a default value. When a NACK has been received through an AICH or an E-AICH, the UE stops preamble retransmission until a previously received UE-specific wait time or a predetermined time according to the default value expires.

The above procedure has been illustrated under the assumption that a UE always receives a wait time, which is to be applied after a common E-DCH is released, from a Node B. A procedure performed when the UE has not received a specific wait time from the Node B is described below with reference to FIG. 12.

As shown in FIG. 12, the UE can receive a cell-specific wait time or a UE-specific wait time from the Node B. Here, the cell-specific wait time is a wait time that is commonly applied to all UEs in the cell. The UK-specific wait time is a wait time that is valid only for a specific UE. Accordingly, in the case where the UE-specific wait time is applied, different UEs can use different wait times. For example, a default cell-specific wait time is transmitted from the RNC to the DE. The default cell-specific wait time can be transmitted through System Information Broadcast (SIB) information. On the other hand, the UE-specific wait time can be transmitted to each UE through an E-AGCH. Although not illustrated, the UE-specific wait time can also be transmitted through an RNC (e.g., an RRC message), an HS-DSCH, or the like (see FIGS. 9 and 10). In the case where the UE has received both the cell-specific wait time and the UE-specific wait time, the UE can preferentially use the UE-specific wait time. If the UE has not received a new wait time to be applied after the common E-DCH is released, the UE can use two options. That is, the UE may be prohibited from accessing the common E-DCH for a wait time according to a default value obtained through the SIB. Alternatively, the UE may update the new wait time to be applied with a previously received UE-specific wait time and may be prohibited from accessing the common E-DCH for the UE-specific wait time.

The case where a method using an E-AGCH is employed among a variety of methods of transmitting a UE-specific wait time will now be illustrated in more detail. This illustration can be applied in a similar manner to other cases where a UE-specific wait time is transmitted.

The method using an E-AGCH can be performed by changing AG mapping. FIG. 13 illustrates an example wherein AG mapping is changed according to an embodiment of the present invention. In FIG. 13, "Previous Mapping of Absolute Grant Value" indicates a conventional AG mapping table and "Example of Proposed Mapping of Absolute Grant Value" indicates an AG mapping table suggested according to an embodiment of the present invention.

As can be seen from the suggested AG mapping table, several upper indices among the conventional AG indices are used as wait times to be applied when a common E-DCH has been released. When an index mapped to a wait time has been received, the UE attempts to access a common E-DCH after waiting a wait time indicated by the received index. The reason why several upper indices are set as wait times in this embodiment is that the amount of data transmitted through the common E-DCH is expected to be smaller than that of the dedicated E-DCH. The number of indices to be used as wait times is determined according to the maximum E-DPDCH/

DPCCH rate set for the common E-DCH. If the maximum E-DPDCH/DPCCH rate of the common E-DCH is limited to $(150/15)^2 \times 4$, AG indices of 29-31 greater than the AG index 28 corresponding to the rate will not be used. Accordingly, E-DPDCH/DPCCH rates corresponding to the AG indices 29-31 can be converted to wait times. Information regarding the changed AG mapping can be set through a hard coding scheme and the network can notify the UE of the changed AG information (for example, a mapping table).

Figure 14:
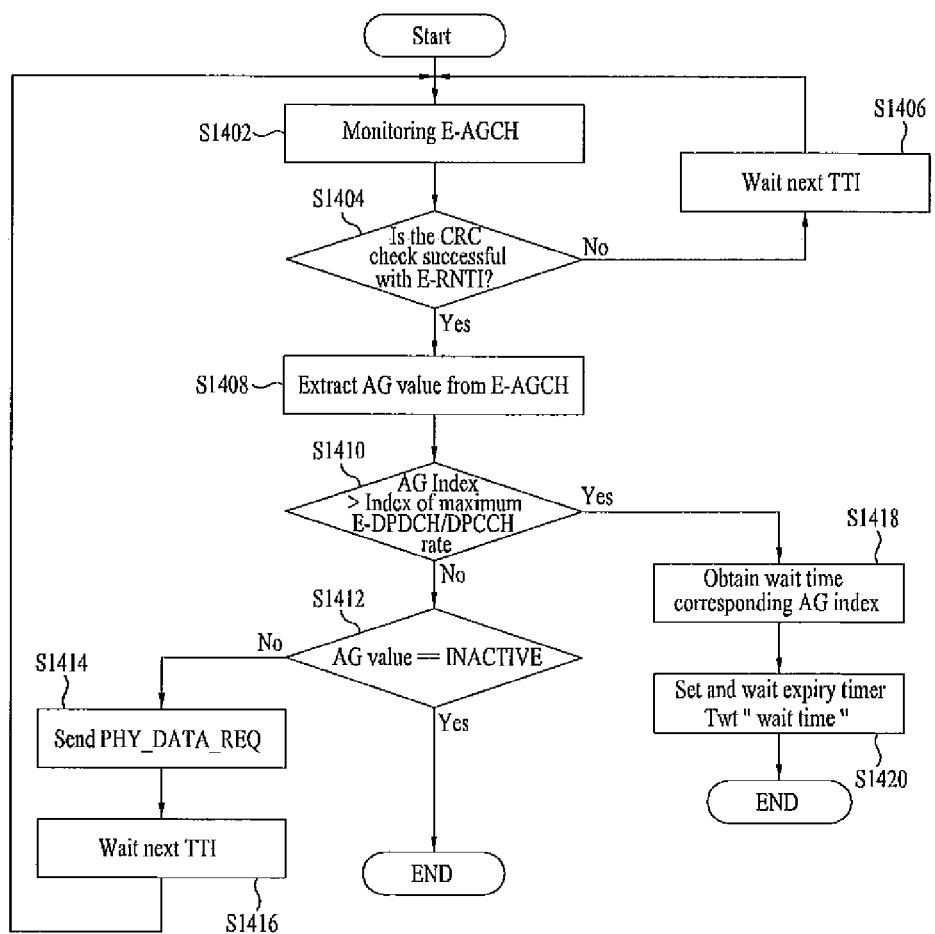
FIG. 14 is a flow chart illustrating how a UE which has received an E-AGCH operates when changed AG value mapping is applied according to an embodiment of the present invention.

FIG. 14 is a flow chart illustrating how a UE which has received an E-AGCH operates when changed AG mapping is applied according to an embodiment of the present invention.

As shown in FIG. 14, the UE monitors an E-AGCH every TTI (S1402). In order to allocate wireless resources to a specific UE, a Node B transmits an AG value, which is CRC-masked with an E-RNTI of the specific UE, to the UE through an E-AGCH. The UE performs CRC checking on the E-AGCH using the E-RNTI of the UE (S1404). When the CRC checking has failed, the UE again decodes the E-AGCH after waiting the next TTI (S1406). When the CRC checking is successful, the UE extracts an AG index from the E-AGCH (S1408).

If the extracted AG index is greater than an index corresponding to the maximum E-DPDCH/DPCCH rate (S1410), the UE obtains a corresponding wait time from the extracted AG index and releases the common E-DCH (S1418). The wait time is a value, of which the network has notified each UE taking into consideration the QoS of the UE, and thus different UEs may have different wait time values Thereafter, the UE sets a wait timer Twt to the wait time (S1420). The UE can attempt to access the common E-DCH after the wait timer expires.

On the other hand, if the extracted AG index is less than or equal to the index corresponding to the maximum E-DPDCH/DPCCH rate (S1410), the UE checks whether or not the extracted AG index corresponds to "INACTIVE" (S1412). If the extracted AG index corresponds to "INACTIVE", the UE releases the common E-DCH. Otherwise, the UE selects an E-TFC using a serving grant update function and the extracted AG index. Thereafter, the UE transmits an amount of data corresponding to the selected TFCI (Sl414). Thereafter, the UE monitors the E-AGCH during the next TTI (S1416).

In the above procedure, if the UE has received a wait time or "INACTIVE" from the network, then the E-DCH is released. The procedure illustrated in this embodiment is performed when the UE has received an ACK (specifically, a common E-DCH resource index) after transmitting a preamble. Accordingly, the procedure illustrated in this embodiment is also applied not only when the UE has received a NACK through an AICH but also when it has received an ACK. This feature is different from that of the RACH transmission procedure in which the UE performs back-off only when it has received a NACK through an AICH.

The following is a description of a method for a network to notify a UE of a changed AG mapping relationship and a wait time according to an embodiment of the present invention and how the UE operates in this method.

FIGS. 15 to 17 illustrate an example SIB format that a network uses to notify a UE of a changed AG mapping relationship through system information.

FIG. 15 illustrates system information block type 5 and 5bis. The system information block type 5 and 5bis may include common E-DCH system information as an option. The common E-DCH system information is provided to a UE which supports the common E-DCH. FIG. 16 illustrates common E-DCH system information suggested in an embodiment of the present invention. The common E-DCH system information includes a field associated with "AG to wait time mapping info" as an option.

FIG. 17 illustrates "AG to wait time mapping info" Information Elements (IEs) suggested in an embodiment of the present invention. As shown in FIG. 17, the "AG to wait time mapping info" IEs include the following IEs.

"Maximum E-DPDCH/DPCCH rate" IE: Indicates a maximum AG index mapped to the E-DPDCH/DPCCH rate. The default value may be 31.

"AG-to-wait time mapping" IE: Indicates the number of AG indices mapped to wait times according to the embodiment of the present invention. The "AG-to-wait time mapping" value is equal to the maximum AG index value "Maximum E-DPDCH/DPCCH rate". For example, "AG-to-wait time mapping" may be equal to 31−"Maximum E-DPDCH/DPCCH rate".

">wait time" IE: Indicates a wait time according to the embodiment of the present invention. The wait time may be expressed on a 10 ms basis. The number of ">wait time" values is equal to the "AG-to-wait time mapping" value. The ">wait time" values are mapped to AG indices that are left after mapping of the E-DPDCH/DPCCH rate. The AG index to which the wait time is mapped indicates to the UE not only the wait time but also release of the common E-DCH.

For example, when it is assumed that the maximum AG index is 31 and the "Maximum E-DPDCH/DPCCH rate" value is 26, the number of AG indices mapped to wait times is 5 (i.e., AG indices of 27-31 are mapped to wait times). In this case, in order to indicate the wait time to the UE, the network notifies the UE of one of the 5 AG indices through an E-AGCH. If the UE receives an AG index from among the AG indices 27-31, then the UE may release the common E-DCH and then may attempt to access the common E-DCH after waiting a wait time corresponding to the received AG index.

By indicating the wait time in this manner, the network can more dynamically allocate the wait time to each UE. For example, if a large number of UEs with a variety of priority levels are present in the cell, the network can indicate a wider variety of wait times to each UE by adjusting the number of AG indices corresponding to the wait times. The network can also dynamically allocate the wait time to the corresponding UE according to network congestion control or wireless resource allocation states.

FIG. 18 illustrates an example wherein a changed SIB and a changed AG mapping table are applied to perform communication according to an embodiment of the present invention.

As shown in FIG. 18, a UE receives an SIB including information regarding an AG mapping table from a network (S1810). When it is assumed that an SIB format illustrated in FIG. 17 is employed, the "Maximum E-DPDCH/DPCCH rate" value is 26 and the "AG-to-wait time mapping" value is 5, and the ">wait time" values are 1, 2, 4, 8, and 16. Accordingly, the changed AG mapping table suggested in the embodiment of the present invention is constructed as follows according to the system information.

AG index "0": Indicates "INACTIVE (Release common E-DCH)",

AG indices "1~26": Indicates "E-DPDCH/DPCCH rates".

AG indices "27~31": Indicates wait times 10 ms, 20 ms, 40 ms, 80 ms, and 160 ms.

Accordingly, the UE updates a common-E-DCH-channel-related configuration as described above.

When the UE has data to be transmitted in uplink, the UE transmits a preamble for access to the common E-DCH in uplink (S1820). When the preamble has been successfully received, the Node B transmits an ACK to the UE. The Node B also notifies the UE of an index of common E-DCH resources through the ACK (S1830). After receiving the ACK from the Node B, the UE transmits initial data using common E-DCH configuration information corresponding to the index. The common E-DCH configuration information includes an initial serving grant value. Here, the UE incorporates an E-RNTI into a MAC PDU of the initial data (S1840). The E-RNTI is included in the MAC PDU only when the MAC PDU is initially transmitted. The E-RNTI is not included in the MAC PDU after the UE receives the E-RNTI through an E-AGCH. Thereafter, using the E-RNTI, the UE monitors the E-AGCH to determine whether or not an AG value corresponding to the UE is present.

Thereafter, the UE receives an AG index of "25" from the E-AGCH (S1850). As shown in the AG mapping table, the AG index "25" corresponds to an E-DPDCH/DPCCH rate of $(150/15)^2 \times 2$. The UE determines the power level and amount of data for transmission in the next TTI using the E-DPDCH/DPCCH rate and then transmits E-DCH data (S1860).

Thereafter, the UE receives an AG index of "30" from the E-AGCH (S1870). As shown in the AG mapping table, the AG index "30" corresponds to a wait time of 80 ms. Accordingly, the UE releases the common E-DCH and waits 80 ms (S1880). Thereafter, if the UE still has data to be transmitted, the UE can reattempt access to the common E-DCH (S1890).

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention have been described focusing mainly on the data communication relationship between a terminal and a Base Station (BS). Specific operations which have been described as being performed by the BS may also be performed by an upper node as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

As is apparent from the above description, the embodiments of the present invention have the following advantages.

First, it is possible to control uplink access load in a wireless communication system.

Second, it is possible to control uplink access load in a CELL_FACH state.

Third, it is possible to control uplink access load of each UE in a CELL_FACH state.

The present invention can be applied to a wireless communication system. More specifically, the present invention can be applied to a method for controlling cell load in a wireless communication system.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

What is claimed is:

1. A method of performing an uplink re-access by a User Equipment (UE) in a wireless communication system, the method comprising:
    performing an uplink access procedure to establish a data transmission channel;
    checking whether or not the data transmission channel is released by a network; and
    delaying uplink re-access to the data transmission channel by a wait time when the data transmission channel is released by the network,
    wherein the wait time is indicated by at least one specific AG (Absolute Grant) index received through an E-AGCH (Enhanced-Absolute Grant CHannel), and
    wherein at least one remaining AG index received through the E-AGCH indicates an AG value associated with a data rate for the data transmission channel,
    wherein the method further comprises:
    receiving mapping information representing a first relation between the wait time and the at least one specific AG index and a second relation between the AG value and the at least one remaining AG index.

2. The method according to claim 1, wherein the UE is in a CELL_Forward Access CHannel (CELL_FACH) state.

3. The method according to claim 1, wherein the uplink access procedure includes a random access procedure.

4. The method according to claim 3, further comprising:
    transmitting a random access preamble for uplink re-access to the data transmission channel in uplink after the wait time elapses.

5. The method according to claim 1, wherein the data transmission channel is a dedicated channel.

6. The method according to claim 1, wherein the data transmission channel is a common Enhanced-Dedicated CHannel (E-DCH).

7. The method according to claim 1, wherein the at least one specific AG index additionally indicates information associated with a release of the data transmission channel.

8. The method according to claim 1, wherein the mapping information is received through system information or a Radio Resource Control (RRC) message.

9. The method according to claim 1, wherein the wait time is UE-specific or cell-specific.

10. A method for controlling uplink re-access by a network in a wireless communication system, the method comprising:
   establishing a data transmission channel for a User Equipment (UE) according to an uplink access procedure;
   transmitting, to the UE, information associated with a wait time for delaying uplink re-access of the UE to the data transmission channel to the UE when the data transmission channel is released; and
   releasing the data transmission channel,
   wherein the wait time is indicated by at least one specific AG (Absolute Grant) index transmitted through an E-AGCH (Enhanced-Absolute Grant CHannel), and
   wherein at least one remaining AG index transmitted through the E-AGCH indicates an AG value associated with a data rate for the data transmission channel,
   wherein the method further comprises:
   transmitting mapping information representing a first relation between the wait time and the at least one specific AG index and a second relation between the AG value and the at least one remaining AG index.

11. The method according to claim 10, wherein the UE is in a CELL_Forward Access CHannel (CELL_FACH) state and the uplink access procedure includes a random access procedure.

12. The method according to claim 10, wherein the data transmission channel is a common Enhanced-Dedicated CHannel (E-DCH).

13. The method according to claim 1, wherein a number of the at least one specific AG index is determined based on a maximum data rate for the data transmission channel.

14. The method according to claim 10, wherein a number of the at least one specific AG index is determined based on a maximum data rate for the data transmission channel.

15. A User Equipment (UE) configured to perform an uplink re-access in a wireless communication system, comprising:
   a processor configured to
   perform an uplink access procedure to establish a data transmission channel,
   check whether or not the data transmission channel is released by a network, and
   delay uplink re-access to the data transmission channel by a wait time when the data transmission channel is released by the network,
   wherein the wait time is indicated by at least one specific AG (Absolute Grant) index received through an E-AGCH (Enhanced-Absolute Grant CHannel), and
   wherein at least one remaining AG index received through the E-AGCH indicates an AG value associated with a data rate for the data transmission channel,
   wherein the processor is further configured to receive mapping information representing a first relation between the wait time and the at least one specific AG index and a second relation between the AG value and the at least one remaining AG index.

* * * * *